United States Patent [19]

Hayashi

[11] Patent Number: 4,581,982
[45] Date of Patent: Apr. 15, 1986

[54] RECIPROCATING PISTON INTERNAL COMBUSTION ENGINE

[75] Inventor: Yoshimasa Hayashi, Yokosuka, Japan

[73] Assignee: Nissan Motor Co., Ltd., Yokohama, Japan

[21] Appl. No.: 382,283

[22] Filed: May 26, 1982

[30] Foreign Application Priority Data

May 27, 1981 [JP] Japan .................. 56-79138

[51] Int. Cl.⁴ .............................................. F01B 31/00
[52] U.S. Cl. ...................................................... 92/127
[58] Field of Search ................... 92/127, 126, 182; 277/73, 27; 123/193 P, 193 CP

[56] References Cited

U.S. PATENT DOCUMENTS

| | | | |
|---|---|---|---|
| 736,781 | 8/1903 | Rice | 92/127 |
| 1,518,801 | 12/1924 | McArthur | 92/126 |
| 1,662,544 | 3/1928 | Jolenberger | 92/126 X |
| 1,798,222 | 3/1982 | Reiland et al. | |
| 2,194,102 | 3/1940 | Taylor | 309/31 |
| 2,378,076 | 6/1945 | Freeman | 92/182 |
| 3,442,183 | 5/1969 | Howe et al. | 92/184 |
| 4,111,104 | 9/1978 | Davison, Jr. | 92/127 |

FOREIGN PATENT DOCUMENTS

| | | |
|---|---|---|
| 438583 | 12/1926 | Fed. Rep. of Germany. |
| 531746 | 10/1921 | France .................. 92/126 |
| 194959 | 3/1923 | United Kingdom. |

Primary Examiner—Edward K. Look
Attorney, Agent, or Firm—Schwartz, Jeffery, Schwaab, Mack, Blumenthal & Evans

[57] ABSTRACT

A reciprocating piston internal combustion engine comprises a piston movably disposed within an engine cylinder, the top surface of the piston defining thereon a combustion chamber; a space formed in the cylinder; a movable member disposed within the space and movable in the direction of a minor thrust side cylinder wall upon receiving a gas pressure within the combustion chamber; and a device for providing the gas pressure into the space of the piston during compression stroke of the engine so that the movable member receives the gas pressure, thereby effectively reducing piston slap noise.

10 Claims, 7 Drawing Figures

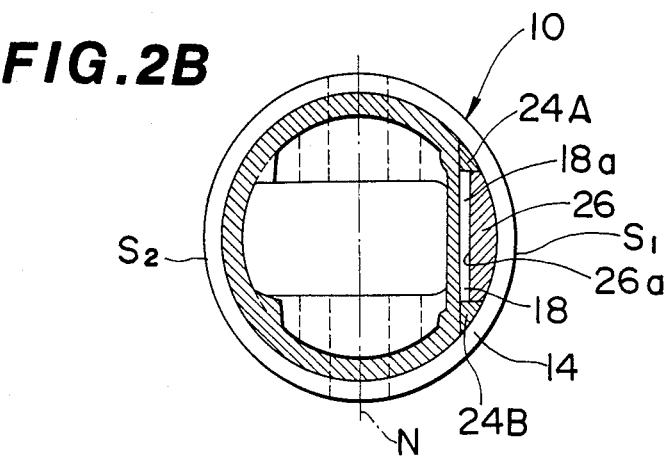
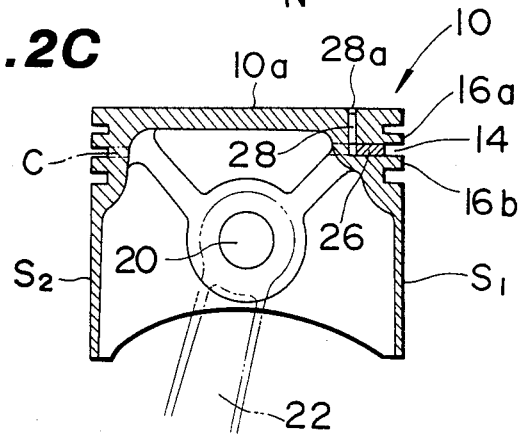
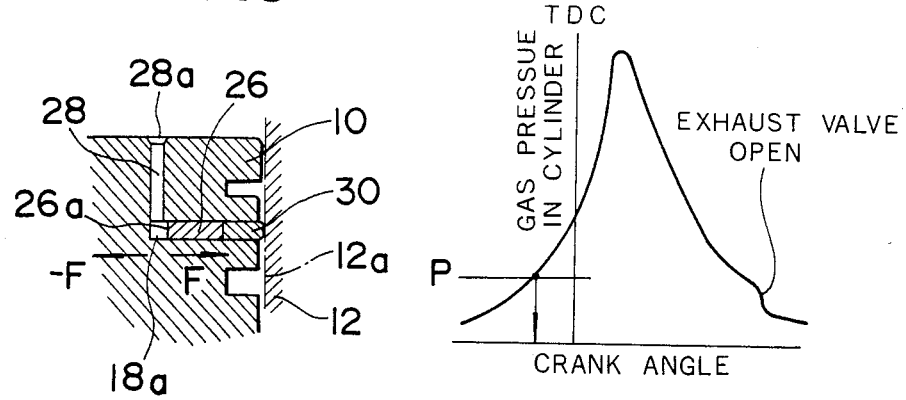

RECIPROCATING PISTON INTERNAL COMBUSTION ENGINE

BACKGROUND OF THE INVENTION

1. Field of the Invention

This invention relates generally to a reciprocating piston internal combustion engine provided with a measure for decreasing piston slap noise, and more particularly to a piston which is provided with means for thrusting the piston upon a major thrust side cylinder wall during the compression stroke.

2. Description of the Prior Art

It is well known in the art, that piston slap noise is generated due to the lateral reciprocal movement of the piston within an engine cylinder during compression and power strokes of a reciprocating piston internal combustion engine. In order to reduce such piston slap noise, so-called piston pin offset has already carried out in which a piston pin is slightly offset from the center line of the piston. This reduces piston slap noise to some extent. However, piston pin offset cannot reduce piston noise to a desired low level, and raises a new problem in which the piston is urged to rotate in a direction around the piston rod.

BRIEF SUMMARY OF THE INVENTION

In accordance with the present invention, a reciprocating piston internal combustion engine comprises a piston movably disposed within an engine cylinder, the top surface of the piston defining thereon a combustion chamber. A movable member is disposed within a space formed in the piston and is movable in the direction of a minor thrust side cylinder wall upon receiving a gas pressure within the combustion chamber. The gas pressure is provided to this space during the compression stroke so that the movable member receives the gas pressure from the combustion chamber. With the thus arranged engine, the piston is positively thrust upon a major thrust side cylinder wall from a point in time far before top dead center in compression stroke. This effectively prevents the piston from slapping on the engine cylinder wall, thereby greatly reducing piston slap noise.

BRIEF DESCRIPTION OF THE DRAWINGS

The features and advantages of the reciprocating piston internal combustion engine according to the present invention will be more clearly appreciated from the following description taken in conjunction with the accompanying drawings in which like reference numerals designate like parts and elements, and in which:

FIG. 2B is a transverse cross section of the piston of FIG. 2A;

FIG. 2C is a vertical cross section of the piston of FIG. 2A:

FIG. 3 is an enlarged fragmentary sectional view illustrating the operation of the engine according to the present invention; and FIG. 4 is a graphical representation showing the variation of gas pressure within an engine cylinder.

DETAILED DESCRIPTION OF THE INVENTION

Figure 1A:
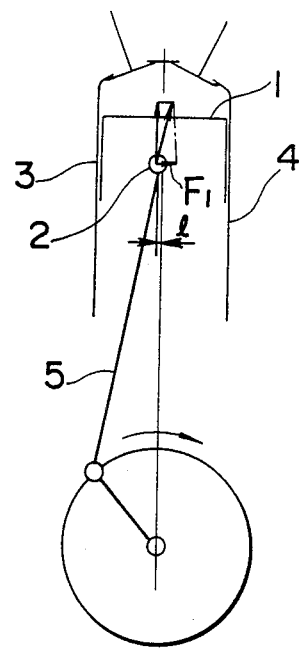
FIGS. 1A and 1B are illustrations for explaining piston movements during compression and power strokes, respectively, in a conventional engine with piston pin offset.
Figure 1B:
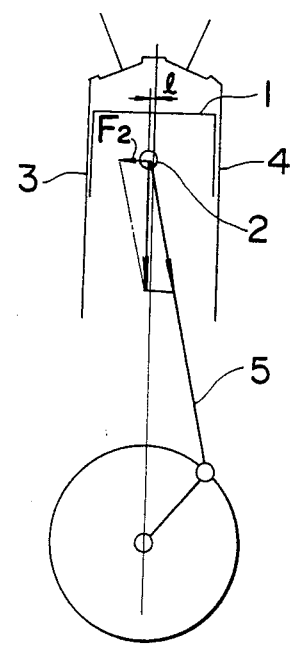

Referring to FIGS. 1A and 1B, a conventional reciprocating piston internal combustion engine will be described along with its major shortcomings. In such an engine, during the compression stroke as shown in FIG. 1A, a force $F_1$ acts on a piston 1 so that the piston 1 is thrust rightward in the drawing. At the power or expansion stroke, the piston 1 receives a force $F_2$ which acts leftward in the drawing since the inclination of a connecting rod 5 becomes reversed relative to that at the compression stroke. When the force acting on the piston 1 changes from $F_1$ to $F_2$, the piston 1 is moved from its rightmost position (where the piston 1 is thrust at its so-called minor thrust surface upon a minor thrust side cylinder wall 4) to its left-most position thus striking at its so-called major thrust surface against a major thrust side cylinder wall 3, thereby generating piston slap noise. As is well known in the art, such piston slap noise is due to slap force which becomes higher as gas pressure within the engine cylinder increases.

In this regard, in order to decrease such piston slap noise, it is known to offset the location of a piston pin 2 toward the major thrust surface of the piston 1 relative to the cylinder center line by a predetermined distance l (for example, about 1 mm) as indicated in FIGS. 1A and 1B, so that the piston 1 can be pressed against the major thrust side cylinder wall 3 as early as possible when it descends from top dead center.

However, even with such a conventional arrangement, piston slap noise has not been lowered to a desired level because the transition of piston movement from the minor thrust side cylinder wall to the major thrust side cylinder wall unavoidably occurs at a position in close proximity to top dead center. Besides, since the piston pin is offset, the gas pressure applied to the piston crown generates a force which causes the piston 1 to rotate clockwise around the piston pin, thus raising the lateral oscillation movement of the piston. This contributes to a further noise increase.

Figure 2A:
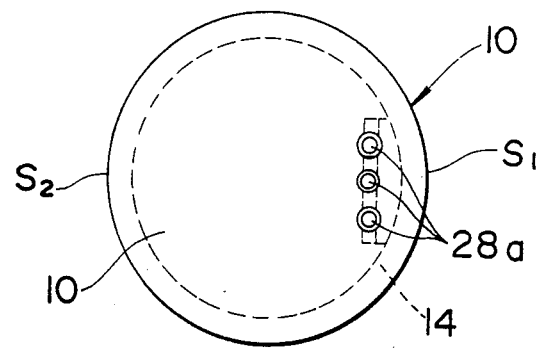
FIG. 2A is a plan view of a piston of a preferred embodiment of a reciprocating piston internal combustion engine in accordance with the present invention.

In view of the above description of the conventional reciprocating piston internal combustion engine, reference is now made to FIGS. 2A, 2B, 2C, and 3, wherein a preferred embodiment of a reciprocating piston internal combustion engine of the present invention is illustrated. The engine comprises a piston 10 slidably disposed within an engine cylinder whose inner wall is denoted by the reference numeral 12 in FIG. 3. The piston 10 is, as usual, formed with a second piston ring groove 14 which is formed annularly along the periphery of the cylindrical section of the piston 10. The groove 14 is defined between the surfaces of opposite lands 16a, 16b, and the bottom of the groove 14 is defined by a peripheral surface of an imaginary thin generally cylindrical or annular section (indicated by the character C) forming part of the piston 10, which cylindrical section C is located between the lands 16a, 16b. As best shown in FIG. 2B, a part of the cylindrical section C is cut out to form a cut-out portion or space 18 which merges in the groove 14. The cut-out portion 18 is so located on the minor thrust side of the piston 10 or in the vicinity of a minor thrust surface $S_1$ at which the piston 10 is thrust upon the cylinder wall 12 by a minor thrust during the compression stroke, similarly to in FIG. 1A. In this connection, the piston 10 is formed with a major thrust surface $S_2$ at which the piston 10 is thrust upon the cylinder wall 12 by a major thrust at the power or expansion stroke, similarly to FIG. 1B. The major thrust surface $S_2$ of the piston 10 is located opposite to the minor thrust surface $S_1$ with respect to a piston pin 20 on which an end of a connecting rod 22 is mounted.

The space 18 is generally bow-shaped or in the shape of a segment of a circle in cross-section. As shown, two segment members 24A, 24B are so positioned as to fill the opposite end portions of the space 18 and secured at a part of them to the piston 10 by means of, for example, welding. Otherwise, the segment members 24A, 24B may be secured in position by means of pins, screws or the like which are inserted through the top surface 10a of the piston 10. As shown, each segment member 24A, 24B is so shaped as to constitute a segment of the outer periphery of the above-mentioned cylindrical section C of the piston 10. The opposite segment members 24A, 24B define therebetween a generally rectangular space 18a in cross-section as best shown in FIG. 2B.

A small piston or movable member 26 is movably disposed within the rectangular space 18a. The small piston member 26 is elongate in the direction of the axis N of the piston pin 20 and movable in the direction perpendicular to the axis of the piston pin 20. The small piston member 26 is so shaped that the outer peripheral surface contactable with a piston ring 30, of the small piston member 26 is arcuate as if it constitutes a part of the cylindrical peripheral surface of the cylindrical section C or the bottom surface of the piston ring groove 14. It is to be noted that the thickness of the small piston member 26 is generally the same as that of the cylindrical section C so as to be slidable within the space 18a when a force is applied thereto. In this connection, the piston member 26 is formed at its both ends with flat surfaces (no numeral) which slidably contact respectively with the flat surfaces of the segment members 24A, 24B. Additionally, the small piston member 26 is formed with an elongate flat pressure receiving surface 26a to which the gas pressure is applied. The gas pressure receiving surface 26a is substantially parallel with a vertical plane (not shown) containing the piston pin axis N.

A plurality of gas introduction openings 28a are formed at the top surface 10a of the piston 10 and extend in the direction of the axis of the piston 10 to form a gas pressure introduction passages 28 which communicate with the space 18a. Accordingly, when the pressure of gas in the combustion chamber defined on the piston top surface 10a is applied to the piston top 10a surface at the compression stroke, the gas pressure is introduced into the space 18a so as to push the piston member 26 outwardly until the small piston member 26 strikes against the second piston ring 30 disposed in the groove 14 as shown in FIG. 3.

The manner of operation of the engine will be discussed with reference to FIGS. 3 and 4. When the gas pressure is introduced into the space 18a at the compression stroke so as to act on the gas pressure receiving surface 26a of the small piston member 26, the small piston member slidably moves outward, thereby pushing the second piston ring 30 with a force F against a minor thrust side cylinder wall 12a which faces the minor thrust surface $S_1$ of the piston 10. As a result, the piston 10 is thrust, in the opposite direction, against a major thrust side cylinder wall (no numeral) with a force $-F$, which major thrust side cylinder wall is opposite to the minor thrust side cylinder wall 12a.

It is preferable to set the area of the gas pressure receiving surface 26a of the small piston member 26 so as to generate a force the same as the force $F_1$ indicated in FIG. 1A when gas pressure in the cylinder reaches a level of P as shown in FIG. 4, by which the piston 10 moves toward the major thrust side cylinder wall at a point in time far before top dead center of the compression stroke, thereby effectively decreasing piston slap noise.

Furthermore, by virtue of the present invention, it is possible to arrange the axis N of the piston pin 20 to lie on the engine cylinder center line without so-called piston pin offset, and therefore forces caused by gas pressure are balanced with each other during two rotations of the piston 20. This suppresses to the minimum the possibility of raising lateral oscillation movement of the piston 10, thereby effectively preventing piston the crown periphery and the piston skirt from unusual striking against the cylinder wall. It will be understood that since the actual displacement of the small piston member 26 only serves to generate the force and accordingly is very small, the seizure and sticking of the small piston member 26 is negligible.

As appreciated from the above, according to the present invention, the piston is provided with a small movable member or piston which is movable toward the minor thrust side cylinder wall of the engine upon receiving a gas pressure introduced from the combustion chamber during compression stroke, thereby thrusting the piston on the major thrust side cylinder wall from a point in time far before top dead center of the compression stroke. This effectively prevents the piston from slapping on the cylinder wall, thus greatly reducing piston slap noise. Besides, by virtue of this arrangement, it is unnecessary to employ piston pin offset, and therefore the piston can be prevented from unusual striking against the cylinder wall, and from seizure due to the momentary breakage of the oil film between the piston and the cylinder wall.

What is claimed is:

1. A reciprocating piston internal combustion engine comprising:
   a piston movably disposed within an engine cylinder, said piston having a top surface and a piston ring, said engine cylinder and the top surface of said piston defining a combustion chamber, said piston having first and second sections which are divided by a vertical plane containing an axis of a piston pin, said first section being formed with a major thrust surface and said second section being formed with a minor thrust surface; and
   means for thrusting said piston against a major thrust side wall of said cylinder before said piston reaches top dead center in said cylinder, said thrusting means comprising:
   means defining a space in said piston, said space communicating with said combustion chamber and being located in said piston second section;
   a movable member disposed within said space, said movable member being capable of being thrust in the direction of a minor thrust side wall of said cylinder by gas pressure within said combustion chamber and being arranged to thrust said piston ring against said minor thrust side wall when thrust by said gas pressure; and means for producing gas pressure within the combustion chamber such that said gas pressure enters said space at the compression stroke of the engine so that said movable member receives said gas pressure and is thrust toward said minor thrust side wall of said cylinder such that said piston is thrust against a major thrust side wall of said cylinder.

2. An engine as claimed in claim 1, wherein said space defining means includes a wall section of said piston, said wall section being located in the vicinity of a minor thrust surface of said piston, said space being merged into a piston ring groove.

3. An engine as claimed in claim 2, wherein said gas pressure providing means includes a gas pressure introduction passage formed in the wall section of said piston, said combustion chamber communicating through said gas pressure introduction passage with said space.

4. An engine as claimed in claim 3, wherein said space is so located as to lie on the generally same level as said piston ring groove relative to the axis of said piston.

5. An engine as claimed in claim 4, wherein said movable member is located inside of said piston ring and said piston ring is disposed within said piston ring groove, and said movable member is contactable with said piston ring, said movable member being movable outwardly so as to push said piston ring against said minor thrust side cylinder wall, when said gas pressure acts on said movable member.

6. An engine as claimed in claim 5, wherein said gas pressure introduction passage opens to the top surface of said piston and extends parallel with the axis of said piston to reach said space.

7. An engine as claimed in claim 2, said space extends generally parallel with a piston pin passing through said piston, said space defining means including first and second segment members secured to said piston wall section and defining therebetween said space.

8. An engine as claimed in claim 7, wherein said movable member is so located as to be elongated parallel with said piston pin, said movable member being movable in the direction perpendicular to a vertical plane containing the axis of said piston pin.

9. An engine as claimed in claim 8, said movable member is formed with an outer peripheral surface contactable with the inner peripheral surface of said piston ring, said movable member peripheral surface being so arcuate as to be identical with the inner peripheral surface of said piston ring.

10. An engine as claimed in claim 1, wherein said gas pressure producing means produces insufficient pressure to thrust said piston against said major thrust sidewall at an initial portion of said compression stroke such that said piston is initially thrust against said minor thrust sidewall of said cylinder and then is thrust against said major thrust sidewall by said gas pressure producing means.

* * * * *